United States Patent [19]

Yamaguchi et al.

[11] Patent Number: 5,301,077
[45] Date of Patent: Apr. 5, 1994

[54] THIN FILM MAGNETIC HEAD

[75] Inventors: Masao Yamaguchi; Takamitsu Kamimura; Kanji Kobayashi, all of Tokyo, Japan

[73] Assignee: TDK Corporation, Tokyo, Japan

[21] Appl. No.: 904,679

[22] Filed: Jun. 26, 1992

[51] Int. Cl.$^5$ .............................................. G11B 5/60
[52] U.S. Cl. .................................................. 360/103
[58] Field of Search ........................................ 360/103

[56] References Cited

U.S. PATENT DOCUMENTS

| 4,797,765 | 6/1989 | Ezaki et al. |
|---|---|---|
| 4,821,131 | 4/1989 | Gotoh ................ 360/103 |
| 4,998,174 | 3/1991 | Wada ................. 360/103 |
| 5,001,583 | 3/1991 | Matsuzaki . |
| 5,006,946 | 4/1991 | Matsuzaki . |
| 5,068,759 | 11/1991 | Matsuzaki . |
| 5,097,369 | 3/1992 | Matsuzaki . |
| 5,124,864 | 6/1992 | Matsuzaki . |
| 5,126,903 | 6/1992 | Matsuzaki . |
| 5,134,531 | 7/1992 | Matsuzaki et al. . |

FOREIGN PATENT DOCUMENTS

| 60-185272 | 9/1985 | Japan . |
|---|---|---|
| 61-17279 | 1/1986 | Japan ................. 360/103 |
| 63-70918 | 3/1988 | Japan . |
| 2-199614 | 8/1990 | Japan . |
| 2-212057 | 8/1990 | Japan . |
| 2-301014 | 12/1990 | Japan . |

Primary Examiner—Richard E. Gluck
Attorney, Agent, or Firm—Oblon, Spivak, McClelland, Maier & Neustadt

[57] ABSTRACT

At the time of polishing an air bearing surface 12 the edge of the air bearing surface 12 is simultaneously beveled to form edge surfaces 14. The air bearing surface 12 is preferably constituted as a flat planar surface 121 having a tapered surface 122 continuous therewith at the air inflow end. In this case, defining the bevel width in regions IV located at the edge surfaces 14 at opposite sides in a direction perpendicular to the air inflow direction and extending in the vicinity of a ridge portion 131 between the central flat planar surface 121 and the tapered inflow end surface 122 and the bevel width in regions II located ahead of an interface 171 between the slider 1 and a thin-film transducer element 17 as $I_4$ and $I_2$ respectively, the bevel width of an air inflow end edge surface 14 (region V) continuous with the tapered inflow end surface 122 as $I_5$ and the bevel width of opposite side edge surfaces 14 (region III) continuous with the central flat planar surface 121 as $I_3$. $(I_4 - I_5)/I_5$ is restricted to not more than 0.4, $(I_3 - I_2)/I_3$ is restricted to not more than 0.2, the bevel width of all edge surfaces 14 is restricted to 4–20 μm, or the bevel width range R thereof is restricted to not more than 5 μm. By in this way restricting the bevel width of the edge surfaces 14 over the entire perimeter of the air bearing surface 12 so as to be highly uniform, there are realized marked improvements in flying stability, particularly a reduction in the variation in roll angle in the flying attitude.

34 Claims, 4 Drawing Sheets

THIN FILM MAGNETIC HEAD

BACKGROUND OF THE INVENTION

1. Field of the Invention

This invention relates to a thin-film magnetic head.

2. Background Art

Increases in data recording capacity, faster access speeds and the like have been accompanied by rising demand for a thin-film head that has a higher permeability than the ferrite head and is able to maintain a high electromagnetic conversion efficiency even at high transfer rates. Thin-film magnetic heads require various ceramic substrate materials as sliders, and as the material for sliders there are used SiC, $ZrO_2$, $Al_2O_3$, $Al_2O_3$-TiC and the like.

For obtaining a thin-film head slider with stable flying characteristics and good running durability it is necessary to polish the medium-facing surface which constitutes the air bearing surface. As disclosed for example in Japanese Patent Public Disclosure Nos. Sho 60-185272, Sho 63-70918, Hei 2-199614, Hei 2-212057, Hei 2-301014 and the like, at the time of polishing the air bearing surfaces of the slider there is used a polishing film or a polishing tape.

On the other hand, from the point of improving running durability, it is preferable to bevel the edges (ridge portion) at the entire perimeter of the air bearing surfaces. This beveling is ordinarily conducted simultaneously with the polishing of the air bearing surface. Therefore, the size of the bevel differs variously with the surface polishing conditions. However, the aforesaid publications take no notice of, and are totally silent regarding, the dimensional precision of the beveled surfaces (edge surfaces) of the edges.

It has been found that when the air bearing surface(s), e.g. rail surfaces, are polished using a polishing film, since, under ordinary conditions, the amount of beveling conducted at the same time is slight, large variation in bevel size arises between different edge portions. The conventional slider having this variation in bevel size has not been satisfactory in the point of flying stability. More specifically, it has been found that flying instability is produced at CSS (Contact-Start-Stop), with increased roll angle variation in the flying attitude. It has further been found that it becomes impossible to secure flying characteristics when the degree of floating is increased.

The main object of this invention is to provide a thin-film magnetic head exhibiting stable flying characteristics, this being achieved by conducting the small amount of beveling conducted simultaneously with surface polishing with high precision.

DISCLOSURE OF THE INVENTION

This object is accomplished by the arrangements of (1)–(34) set out below.

(1) A thin-film magnetic head having a thin-film transducer element at an air outflow end of a slider, beveled edge surfaces being formed at edges completely surrounding an air bearing surface, the air bearing surface having at an air inflow end thereof a tapered inflow end surface continuous with a central flat planar surface, and $(l_4-l_5)/l_5$ being not more than 0.4, where $l_4$ is the bevel width in regions located at the edge surfaces at opposite sides in a direction perpendicular to the air inflow direction and extending ±0.1 mm in the air inflow direction from, as a base point, a ridge portion between the central flat planar surface and the tapered inflow end surface, and $l_5$ is the bevel width of an air inflow end edge surface continuous with the tapered inflow end surface.

(2) A thin-film magnetic head according to (1) above, wherein $(l_3-l_2)/l_3$ is not more than 0.2, where $l_2$ is the bevel width in regions located at the edge surfaces at opposite sides in a direction perpendicular to the air inflow direction and extending 0.2 mm toward the air inflow end from an interface between the slider and the thin-film transducer element, and $l_3$ is the bevel width of opposite side edge surfaces continuous with the central flat planar surface.

(3) A thin-film magnetic head according to (1) or (2) above, wherein the bevel width $l_1$ of an air outflow end edge surface is 4–20 μm.

(4) A thin-film magnetic head according to (3) above, wherein the bevel width of all edge surfaces is 4–20 μm.

(5) A thin-film magnetic head according to (4) above, wherein a bevel width range R (JIS Z81081) of all edge surfaces is not more than 5 μm.

(6) A thin-film magnetic head according to any of (1)–(5) above, wherein the air bearing surface is formed on a pair of rails provided on a surface facing a magnetic medium to lie parallel to the direction of air inflow at opposite sides in a direction perpendicular to the direction of air inflow.

(7) A thin-film magnetic head according to any of (1)–(5) above, wherein the air bearing surface occupies almost the whole area of a surface facing a magnetic recording medium.

(8) A thin-film magnetic head according to any of (1)–(5) above, wherein flying of the thin-film magnetic head over a magnetic recording medium is achieved by a contact-start-stop method.

(9) A thin-film magnetic head according to any of (1)–(5) above, wherein Vickers hardness HV (500 g) of the slider of the thin-film magnetic head is not less than 1100.

(10) A thin-film magnetic head according to (1) above, wherein beveling of the edge surfaces is conducted simultaneously with polishing of the air bearing surface.

(11) A thin-film magnetic head according to (10) above, wherein the polishing is conducted with a diamond polishing film employing fine diamond particles.

(12) A thin-film magnetic head according to (11) above, wherein the mean diameter of the diamond particles is not more than 1.0 μm.

(13) A thin-film magnetic head according to (11) or (12) above, wherein the thickness of the diamond polishing film is not more than 1.0 μm.

(14) A thin-film magnetic head having a thin-film transducer element at an air outflow end of a slider, beveled edge surfaces being formed at edges completely surrounding an air bearing surface, and $(l_3-l_2)/l_3$ being not more 0.2, where $l_2$ is the bevel width in regions located at the edge surfaces at opposite sides in a direction perpendicular to the air inflow direction and extending 0.2 mm toward the air inflow end from an interface between the slider and the thin-film transducer element, and $l_3$ is the bevel width of opposite side edge surfaces continuous with the central flat planar surface.

(15) A thin-film magnetic head according to (14) above, wherein the bevel width $l_1$ of an air outflow end edge surface is 4–20 μm.

(16) A thin-film magnetic head according to (15) above, wherein the bevel width of all edge surfaces is 4–20 μm.

(17) A thin-film magnetic head according to (16) above, wherein a bevel width range R (JIS Z81081) of all edge surfaces is not more than 5 μm.

(18) A thin-film magnetic head according to any of (14)–(17) above, wherein the air bearing surface is formed on a pair of rails provided on a surface facing a magnetic medium to lie parallel to the direction of air inflow at opposite sides in a direction perpendicular to the direction of air inflow.

(19) A thin-film magnetic head according to any of (14)–(17) above, wherein the air bearing surface occupies almost the whole area of a surface facing a magnetic recording medium.

(20) A thin-film magnetic head according to any of (14)–(17) above, wherein flying of the thin-film magnetic head over a magnetic recording medium is achieved by a contact-start-stop method.

(21) A thin-film magnetic head according to any of (14)–(17) above, wherein Vickers hardness HV (500 kg) of the slider of the thin-film magnetic head is not less than 1100.

(22) A thin-film magnetic head according to (14) above, wherein beveling of the edge surfaces is conducted simultaneously with polishing of the air bearing surface.

(23) A thin-film magnetic head according to (22) above, wherein the polishing is conducted with a diamond polishing film employing fine diamond particles.

(24) A thin-film magnetic head according to (23) above, wherein the mean diameter of the diamond particles is not more than 1.0 μm.

(25) A thin-film magnetic head according to (23) or (24) above, wherein the thickness of the diamond polishing film is not more than 1.0 μm.

(26) A thin-film magnetic head having a thin-film transducer element at an air outflow end of a slider, beveled edge surfaces being formed at edges completely surrounding an air bearing surface, the bevel width of all edge surfaces being 4–20 μm, and a bevel width range R (JIS Z81081) of all edge surfaces being not more than 5 μm.

(27) A thin-film magnetic head according to (26) above, wherein the air bearing surface is formed on a pair of rails provided on a surface facing a magnetic medium to lie parallel to the direction of air inflow at opposite sides in a direction perpendicular to the direction of air inflow.

(28) A thin-film magnetic head according to (26) above, wherein the air bearing surface occupies almost the whole area of a surface facing a magnetic recording medium.

(29) A thin-film magnetic head according to any of (26)–(28) above, wherein flying of the thin-film magnetic head over a magnetic recording medium is achieved by a contact-start-stop method.

(30) A thin-film magnetic head according to any of (26)–(28) above, wherein Vickers hardness HV (500 kg) of the slider of the thin-film magnetic head is not less than 1100.

(31) A thin-film magnetic head according to (26) above, wherein beveling of the edge surfaces is conducted simultaneously with polishing of the air bearing surface.

(32) A thin-film magnetic head according to (31) above, wherein the polishing is conducted with a diamond polishing film employing fine diamond particles.

(33) A thin-film magnetic head according to (32) above, wherein the mean diameter of the diamond particles film is not more than 1.0 μm.

(34) A thin-film magnetic head according to (32) or (33) above, wherein the thickness of the diamond polishing film is not more than 1.0 μm.

OPERATION AND EFFECT

In this invention, it is preferable to ensure very high uniformity of the bevel width at all edge surfaces surrounding the air bearing surface by using a prescribed diamond polishing film for surface-polishing of the air bearing surface. More specifically, the air bearing surface of the slider is formed at its air outflow end with a tapered surface continuous with a central flat planar surface and at its air inflow end with a thin-film transducer element, and the size of the bevel varies greatly at the ridge between the tapered surface and the flat planar surface and at the interface between the thin-film transducer element and the slider. Preferably this is restricted by using a prescribed diamond polishing film for reducing the amount of variation as much as possible. This results in an unexpected effect of greatly improved flying stability, particularly, inter alia, in a reduction of roll angle variation in the flying attitude.

SPECIFIC CONSTITUTION

The specific constitution of the invention will hereinafter be explained with reference to the attached drawings.

Figure 1:
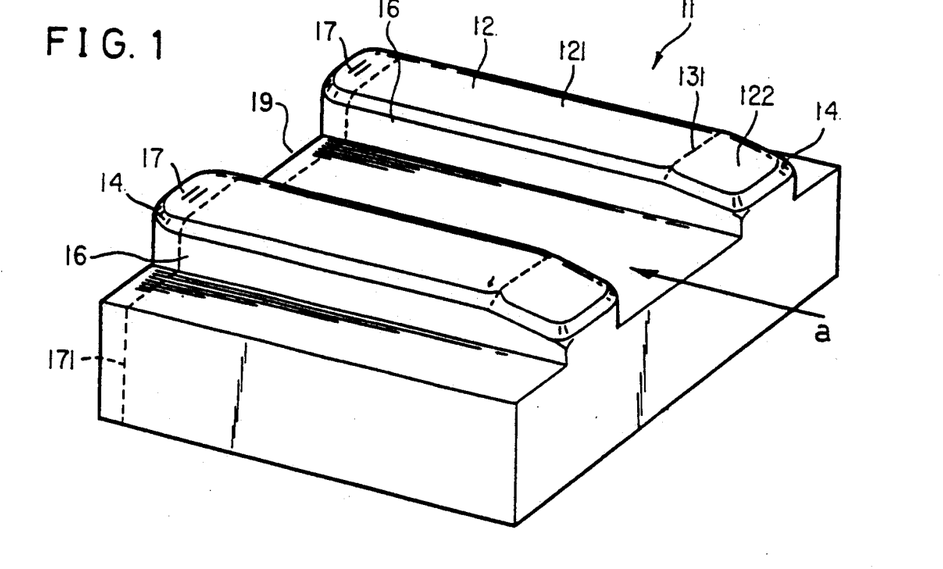
FIG. 1 is a perspective view of an example of the thin-film magnetic head according to the invention and FIG. 2 is a plan view of FIG. 1.
Figure 2:
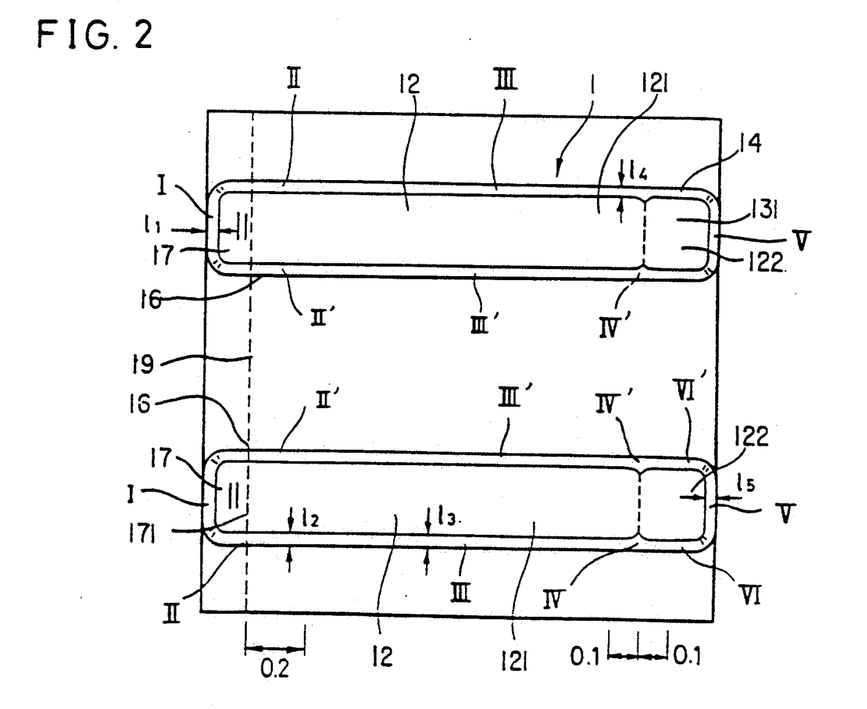
Figure 3:
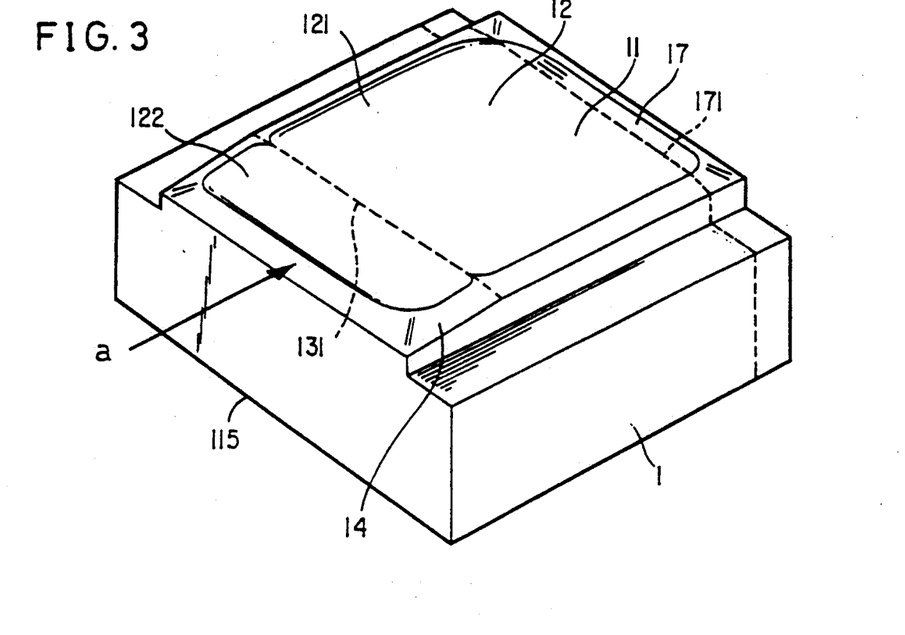
FIG. 3 is a perspective view of another example of the thin-film magnetic head according to the invention and FIG. 4 is a plan view of FIG. 3.
Figure 4:
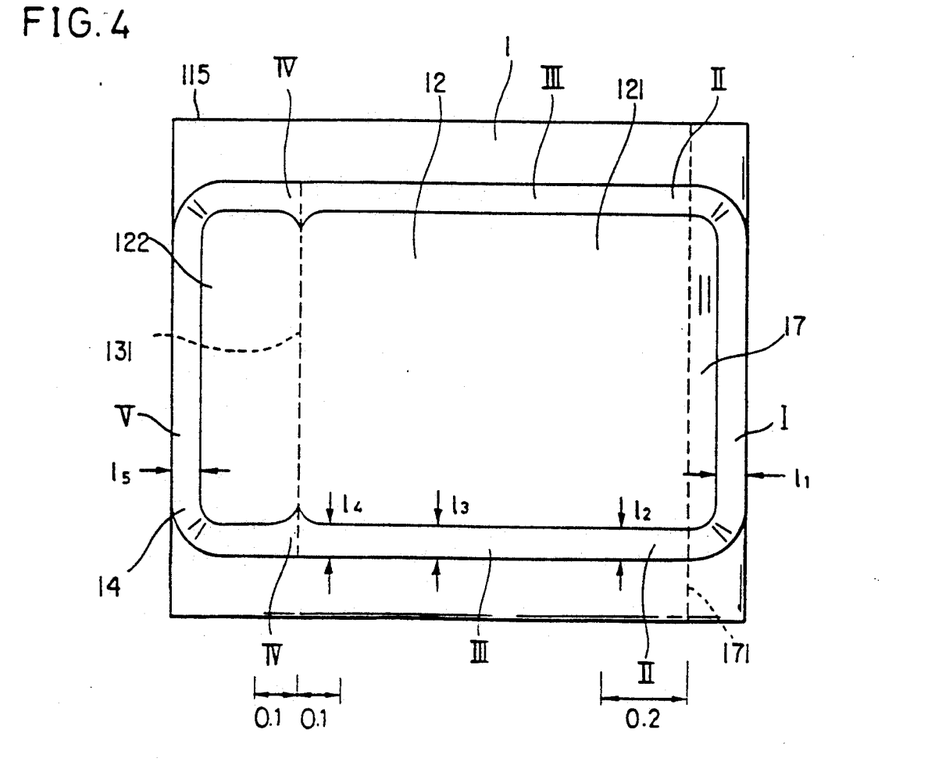

First, the thin-film magnetic head obtained in accordance with the invention will be explained. FIGS. 1 and 2, FIGS. 3 and 4, and FIGS. 5 and 6 each show perspective and plan views of an example of the thin-film magnetic head. The figures are drawn to an enlarged scale relative to the actual size for clarifying the subject of the dimensional restrictions according to the invention. In these figures, the slider 1 has a flat air bearing surface 12 on its medium-facing surface 11, and the arrow a indicates the air flow direction when the slider is combined with a magnetic disk. In FIGS. 1 and 2, two rails 16, 16 are formed on the medium-facing surface 11 at opposite sides relative to the air flow direction a, with a center slot 19 therebetween. The medium-facing surfaces on the rails 16, 16 constitute air bearing surfaces 12, 12. Provision of three or more rails 16, 16 is possible. In FIGS. 3 and 4 and FIGS. 5 and 6, the air bearing surface 12 is formed over almost the whole area of the medium-facing surface 11. One or more thin-film transducer elements 17 are formed to a total thickness of 30–60 μm at the air outlet end of the slider 1 using a thin-film laminating technique. The size of the medium-facing surface is on the order of (0.2–4 mm)×(0.2–3.2 mm).

In case of use in a disk drive, the surface 115 on the opposite side of the slider 1 from the medium-facing surface 11 is head-stacked on a gimbals assembly and driving is conducted in this state by the Contact-Start-Stop method (hereinafter referred to as CSS) for starting and stopping. When the magnetic disk is stationary, the spring force of the head suspension device presses the air bearing surface 12 onto the surface of the magnetic disk. However, when the magnetic disk rotates, a dynamic lift acts on the air bearing surface 12 and operation proceeds at the flying height where the dynamic lift and the spring pressure are in balance. While CSS particularly enables effective utilization of the effect of suppressing roll angle variation in the flying attitude, it can also be used for so-called dynamic rotating.

Figure 5:
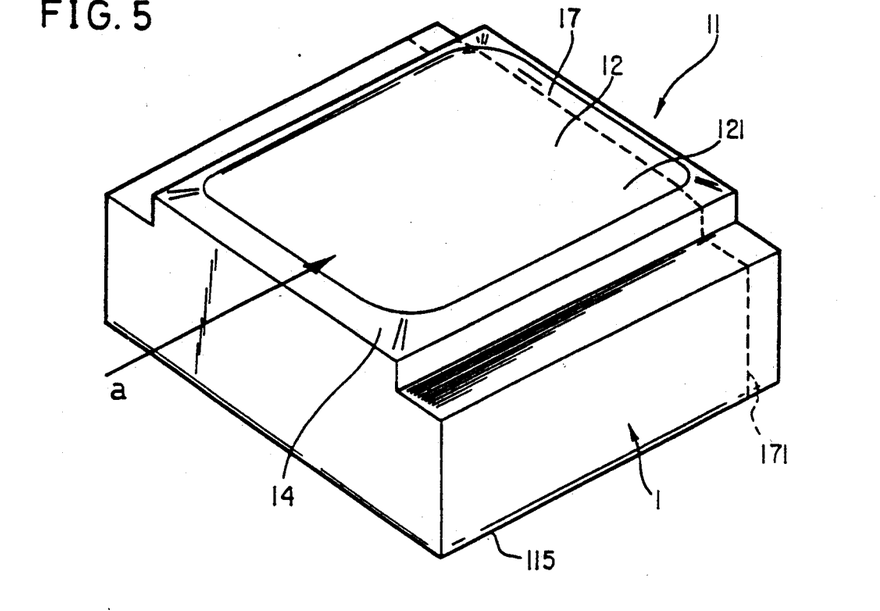
FIG. 5 is a perspective view of still another example of the thin-film magnetic head according to the invention and FIG. 6 is a plan view of FIG. 5.
Figure 6:
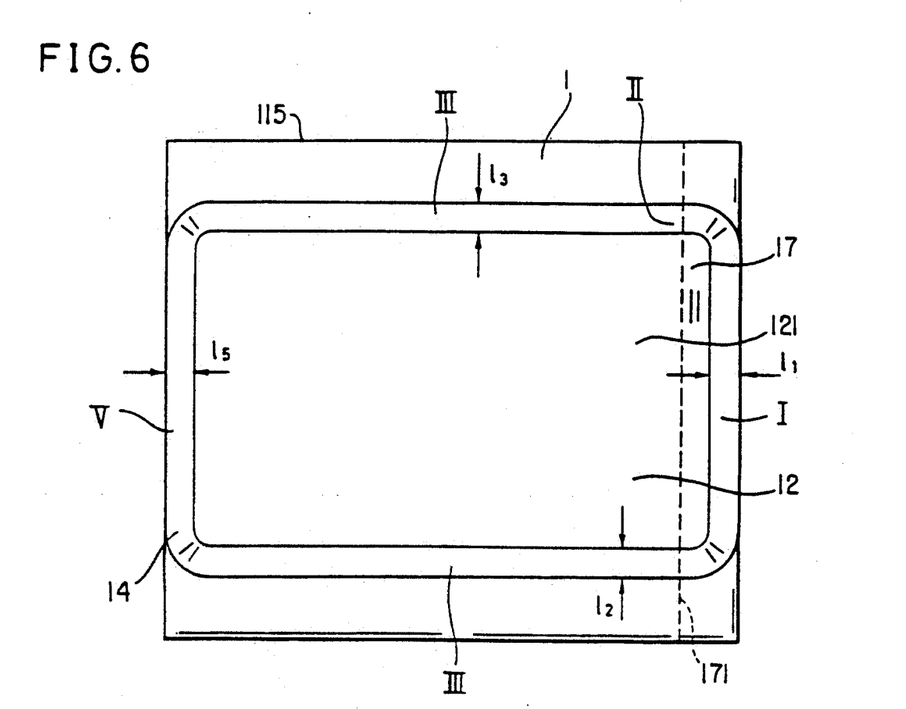

As shown in FIGS. 1 and 2 and FIGS. 3 and 4, each air bearing surface 12 is constituted of a central flat planar surface 121 and an air inflow end tapered surface 122 that is continuous with the air inflow end of the flat planar surface 121 and slopes at a slight angle with respect to the flat planar surface 121. The formation of the tapered surface 122 is conducted in advance of a polishing step for polishing the air bearing surface and carrying out the beveling that is conducted simultaneously therewith. FIGS. 5 and 6 show an example not provided with the tapered surface 122.

The whole perimeter of the air bearing surface 12 of the foregoing description is beveled to form an edge surface 14. The bevel width of the edge surface 14 is controlled to a high degree of uniformity over the entire perimeter, with the variation in the bevel width being small even at the ridge portion 131 between the tapered surface 122 and the flat planar surface 121 and at the interface 171 between the thin-film transducer element 17 and the slider 1, which are the places where variation is most apt to occur.

More specifically, in the case where the tapered surface 122 is provided, where $l_4$ is defined as the bevel width of the edge surface 14 in regions IV located at the opposite sides in a direction perpendicular to the air inflow direction (the width direction) and extending ±0.1 mm in the air inflow direction from, as a base point, a ridge portion between the central flat planar surface and the tapered inflow end surface, and $l_5$ is defined as the bevel width of a region V of the edge surface 14 continuous with the tapered surface 122 (in the case of FIGS. 5 and 6 where no tapered surface 121 is provided, the region V is that continuous with the flat planar surface 121), $(l_4-l_5)/l_5$ is restricted to not more than 0.4, preferably not more than 0.35, more preferably 0–0.3 and most preferably 0.05–0.3. In this case, the bevel width is the perpendicular distance between the side surface of the head medium-facing surface (for example, the side surface of the rail 16) with the flat planar surface 121 of the air bearing surface 12 placed flat and the boundary of the air bearing surface 12, and is calculated with the flat planar surface 121 placed flat by using a two-beam microscope to measure the interference fringe occurrence region by the two-beam interference method. In the two-beam interference method, one of two beams of equal intensity obtained by beam splitting is directed onto a reference mirror (glass reference plate) and the other onto the specimen, and the difference between the light paths of the reflected beams is measured. At this time, for example by using in the two-beam microscope a green (546 nm) light source obtained by a multi-layer interference filter, it is possible to draw on the object under examination contour lines of the width of the spacing between the interference fringes appearing every half wavelength (273 nm), for example, and the bevel width is measured from the contour line occurrence region and the bevel depth from the contour lines. It suffices to average sample measurements taken at about three approximately equally spaced points in the regions III, III' discussed later and at about two approximately equally spaced points in other regions. The region V, and further a region I to be discussed later, are regions formed at linear portions in the width direction (direction perpendicular to the air inflow direction) at the air inflow and air outflow ends of the air bearing surface 12.

Further, where $l_2$ is defined as the bevel width of the edge surface 14 in regions II located at opposite sides (outside extremities) in the direction perpendicular to the air inflow direction (width direction) and extending 0.2 mm toward the air inflow end from, as a base point, the interface 171 between the part of the slider 1 at the rear end of the flat planar surface 121 of the air bearing surface 12 and the thin-film transducer element 17, and $l_3$ is the bevel width of the edge surface 14 in regions III continuous with the central flat planar surface 121 at opposite sides (outside extremities) and extending from the air inflow side end of the region II to a position 0.1 mm short of the air outflow side end of the region IV (in the case of FIGS. 5 and 6 where no tapered surface 121 is provided, the air inflow end ridge portion of the flat planar surface 121), it is preferable to restrict $(l_3-l_2)/l_3$ to not more than 0.2 and more preferable to restrict it to 0–0.15. This $(l_3-l_2)/l_3$ becomes 0.3 or more with ordinary polishing. Moreover, the aforesaid $(l_4-l_5)/l_5$ becomes 0.5 or more. So, by restricting the relationship between the bevel widths $l_4$, $l_2$ (in the vicinity of the ridge portion 131 between the tapered surface 122 and the flat planar surface 121 and upstream of the interface 171 of the slider 1 with the element 17) and the bevel widths $l_5$, $l_3$ (at the inflow end and the sides of the flat planar surface), the roll angle variation in flying attitude is, in particular, critically reduced.

When a plurality of the rails 16, 16 are provided, the regions IV' of the edge surface 14 located on the inside (inner side) edge surfaces 14 of the rails 16, 16 in the vicinity of the ridge portion between the tapered surface 122 and the air bearing surface 12, the regions II' located upstream of the interface 171 between the thin-film transducer element 17 and the slider 1, the side regions III' of the flat planar surface 121, etc. are preferably restricted in entirely the same way as the aforesaid outside edge surfaces 14. Further, where the bevel width of the edge surface 14 at the air outflow end is defined as $l_1$, it is preferable to restrict the bevel widths of the regions III, III' of the edge surface 14 at the sides of the flat planar surface 121, of the regions VI, VI' at the sides of the tapered surface 122, etc., along with the bevel widths $l_2$, $l_4$, $l_5$ of the regions II, II' IV, IV', V, to a value within 120% of the bevel width $l_1$. By making the bevel width of the edge surface 14 uniform over the entire perimeter in this way, the floating characteristics are further improved.

In addition, the bevel width of the edge surface 14 over the entire perimeter is preferably restricted to 4–20 $\mu$m, more preferably to 8–20 $\mu$m. In particular, the air outflow end is provided with the thin-film transducer element 17 and when the bevel amount $l_1$ of this region I is 25 $\mu$m or more, the element is liable to incur scratches or the like, so that it is preferable to hold the bevel amount $l_1$ to within 20 $\mu$m. On the other hand, when it is less than 4 $\mu$m the beveling operation becomes unstable and the element is liable to incur scratching during endurance running. If the bevel width $l_1$ of the element side region I is restricted to the range of 4–20 $\mu$m, and the relationships between $l_4$ and $l_5$, $l_3$ and $l_2$, etc. are restricted according to the invention, the other regions can be automatically restricted to the range of 4–20 $\mu$m. The bevel width at region I is preferably 4–20 $\mu$m, more preferably 8–20 $\mu$m, and at other regions is preferably 4–20 $\mu$m, more preferably 5–15 $\mu$m.

Further, while it is preferable for the bevel width to be 4–20 $\mu$m at all regions of the edge surface 14, it is preferable for the range R of the bevel width as stipulated by JIS Z81081 (difference between the maximum and minimum values) to be restricted to not more than 5 $\mu$m.

Moreover, in such a case, for improving the flying stability, the bevel depth as observed with the flat planar surface 121 of the air bearing surface 12 fixed vertically is preferably restricted to around 0.05–0.06 $\mu$m over the entire perimeter of the edge surface. This bevel depth can be calculated by measuring the interference fringe occurrence region with a two-beam microscope in the same manner as described earlier. Alternatively, it can be obtained from the contour lines at the time of the aforesaid measurement of the bevel width. It is also possible to obtain the bevel width from the contour lines at the time of measuring the bevel depth with the air bearing surface 12 fixed vertically. In the production of 100 heads, for example, the bevel widths and bevel depths at all parts of the edge portions over the entire perimeters thereof can be restricted to a coefficient of variation of not more than 10%, particularly not more than 9%, thus making it possible to obtain consistent flying characteristics in the individual products.

The slider material is specified to have a Vickers hardness (JIS Z 2244 Test load: 500 g) HV (500 g) of not less than 1100, preferably in the range of 1100–3000. In this case, the lower limit value is preferably not less than 1300, more preferably nut less than 1500 and most preferably not less than 1800, whereby the invention provides an even more excellent effect.

Suitable as such a ceramic material are $Al_2O_3$-$TiO_2$ [HV (500) about 1150], MgO-NiO-$ZrO_2$ (about 1200), $ZrO_3$ (about 1200–1600), $ZrO_2$-$Al_2O_3$ (about 1400–1600), $Al_2$-$O_3$-Tic-AlN (1700–2000), SiC (about 1800–2000), $Al_2O_3$-TiC (about 2000–2300), and the like. These may further contain Mg, Y, $ZrO_2$, $TiO_2$ and the like as additives. Among these, a ceramic having $Al_2O_3$-TiC as its principal component is particularly suitable for the present invention from the point of machinability.

Figure 7:
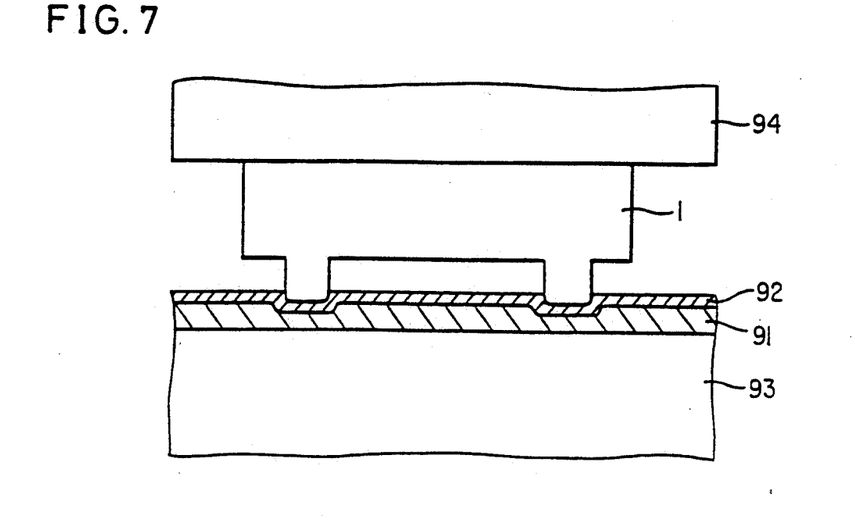
FIG. 7 is a front view for explaining a of polishing and beveling the air bearing surface of slider of a thin-film magnetic head.
Figure 8:
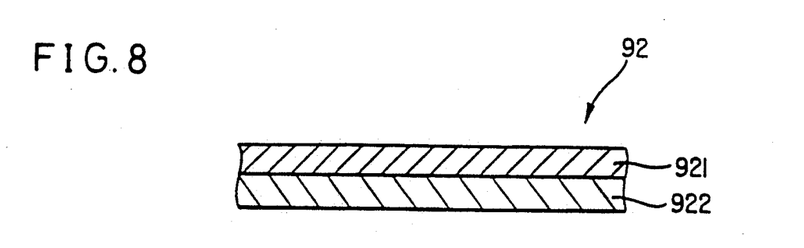
FIG. 8 is a sectional view showing an example of the polishing film used for polishing and beveling.

The edge surface 14 of such type produced by the beveling is formed simultaneously with the polishing of the air bearing surface. FIG. 7 shows the magnetic head slider 1 illustrated in FIGS. 1 and 2 being polished using an elastic sheet 91, a polishing film 92, a work table 93 and a jig 94. The slider in this case may be of any of the aforesaid structures. The elastic sheet 91 acts as a support member for the polishing film 92.

As shown in FIG. 7, the polishing film 92 consists of a polishing agent layer 921 formed on a flexible film 922 serving as a support member. The polishing agent layer 921 can preferably be fabricated using synthetic diamond abrasive particles or other such fine diamond particles, using a resin binder of, for example, the polyurethane resin type, carrying out coating using a diluent solvent of, for example, the MEK/toluene/cyclohexanone mixture type, and drying the result. This paste is applied evenly to form a layer on the support member using any of various coating machines. As the flexible film 922 serving as the support member there can be used polyethylene terephthalate (PET), polyethylene naphthalate (PEN), polyamide, polyimide, or the like.

The mean grain diameter of the diamond particles suitable for use is preferably not more than 1.0 $\mu$m, more preferably 0.1–1.0 $\mu$m, still more preferably 0.1–0.9 $\mu$m, and most preferably 0.1–0.5 $\mu$m. The ratio of diamond particles to the binder is about 1:1/7–1 by weight. The thickness of the polishing agent layer 921 is preferably 1–8 $\mu$m (lower is better).

The magnetic head slider 1 is attached to the jig 94 by means of an adhesive or the like and the medium-facing surface 11 side of the slider 1 of the thin-film magnetic head is contacted with the surface of the polishing film 92 supported by the elastic sheet 91, under the application of a load to the jig 94, and the slider 1 is polished by moving it relative to the polishing film 92.

For depressing the diamond polishing film in the preferable state as shown in FIG. 7 at this time, it is preferable to specify the stiffness $ET^3$, defined in terms of Young's modulus as E and being an index of the flexibility of the polishing film, as $0.8–3.0\times10^5$ $(\mu m)^3$ kg/mm$^2$, more preferably $0.8–1.6\times10^5$ $(\mu m)^3$ kg/mm$^2$, most preferably $0.8–1.2\times10^5$ $(\mu m)^3$ kg/mm$^2$. The flexible film serving as the support member is formed of a material as set out above, and since its Young's modulus is within a prescribed range, the stiffness of the diamond polishing film depends to a high degree on its total thickness. Therefore, if the thickness of the polishing film is too large or too small, the close contacting property is degraded and the polishing and beveling of the polished surface and the edge surface become nonuniform. For this reason, it is preferable to set the stiffness of the diamond polishing film within the aforesaid value range by making the thickness of the film not more than 10 $\mu$m, preferably 2–10 $\mu$m. By this, variation in the edge surface bevel amount is suppressed and stable flying characteristics are obtained.

The relative movement during polishing can be achieved by moving either the slider 1 or the polishing film 92. Moreover, the polishing film can be made circular, the circle rotated about its center, and polishing done in the manner of so-called buffing. Alternatively, a composite consisting of a long polishing film and elastic sheet can be made into the form of an endless tape by forming it into a ring with the polishing film on the outside and the polishing be done by running of the endless tape. The aforesaid loading is in the range of 5–200 g per magnetic head. In addition, while the polishing time varies with the hardness of the slider 1, the grain diameter of the diamond particles, the size of the load and the like, it is roughly about 10–300 sec.

EMBODIMENTS

Next, embodiments of the invention will be presented, and the invention explained in further detail.

Embodiment 1

As polishing materials, pastes with the following compounding ratios were prepared using diamond with the mean grain diameters shown in Table 1, and were used to prepare diamond polishing films with the total thicknesses shown in Table 1 by coating onto prescribed elastic sheets.

| Diamond abrasive particles | 100.0 parts by weight |
| --- | --- |
| Polyurethane resin | 20.0 parts by weight |
| Diluent solvent | 100.0 parts by weight |

These polishing films were used to polish sliders of the structure of FIGS. 1 and 2 having 2.8×2.24 mm medium-facing surfaces, under identical loading and polishing time conditions. The head sliders were made of $Al_2O_3$-$TiO_2$ and were magnetic thin-film magnetic heads having sliders with an HV (500 g) of 2000. The results are shown in Table 1. Table 1 shows the mean values of $l_4$, $l_5$ of the regions IV, V and the maximum value of $(l_4 l_5)/l_5$, for 100 samples. An interference object lens manufactured by Nikon was used on the two-beam microscope.

The head flying stability following the aforesaid polishing was measured in terms of the flying attitude. More specifically, the slider to be measured was flown over a glass disk rotated at a speed of 3600 rpm in the flying measurement apparatus and the stability of the roll tilt was measured using white light as the interference light. The evaluation was made in the following five grades, a level of 3 or higher being OK. The results are also shown in Table 1.

| Evaluation | Roll angle tilt for 100 heads |
| --- | --- |
| 5 | Not more than 0.01 μm |
| 4 | Not more than 0.02 μm |
| 3 | Not more than 0.03 μm |
| 2 | Not more than 0.04 μm |
| 1 | Not more than 0.05 μm |

TABLE 1

| Sample No. | Polishing Film Total thickness (μm) | Polishing Film Diamond grain diameter (μm) | Region IV $l_4$ (μm) | Region V $l_5$ (μm) | $(l_4 - l_5)/l_5$ (%) | Flying attitude stability roll tilt |
| --- | --- | --- | --- | --- | --- | --- |
| 1 | 6 | 1.0 | 12.8 | 10.2 | 20 | 5 |
| 2 | 8 | 1.0 | 12.2 | 9.2 | 25 | 5 |
| 3 | 10 | 1.0 | 11.5 | 8.0 | 30 | 4–5 |
| 4 | 12 | 1.0 | 10.8 | 7.2 | 33 | 3–5 |
| 5 (Comparison) | 15 | 1.5 | 8.8 | 1.8 | 80 | 1–5 |
| 6 (Comparison) | 20 | 1.5 | 7.2 | 0.8 | 88 | 1–5 |
| 7 (Comparison) | 15 | 1.0 | 15.4 | 3.4 | 78 | 1–5 |
| 8 (Comparison) | 10 | 1.0 | 13.4 | 4.1 | 69 | 1–5 |
| 9 (Comparison) | 8 | 1.0 | 13.1 | 7.1 | 46 | 2–5 |

The measurement results for 100 pieces showed that when the difference between $l_4$ and $l_5$ is within 40% of $l_5$, the roll tilt in flying attitude is small and stable, and that when it exceeds 40%, variation arose even within the 100 pieces and the instability of the roll tilt increased. The CV of $l_4$ and $l_5$ in Samples No. 1–4 was not more than 9%, while the CV of $l_4$ and $l_5$ in Comparative Samples No. 5–9 exceeded 10%. Further, the range R of the bevel amount was 5 μm in all 100 pieces.

Embodiment 2

Next, the mean values of $l_2$, $l_3$ of the regions II and III and the maximum value of $(l_3 - l_2)/l_3$ were similarly measured for 100 samples. The results are shown in Table 2.

TABLE 2

| Sample No. | Polishing Film Total thickness (μm) | Polishing Film Diamond grain diameter (μm) | Region II $l_2$ (μm) | Region III $l_3$ (μm) | $(l_3 - l_2)/l_3$ (%) | Flying attitude stability roll tilt |
| --- | --- | --- | --- | --- | --- | --- |
| 11 | 4 | 1.0 | 11.4 | 12.3 | 7 | 5 |
| 12 | 6 | 1.0 | 10.2 | 11.4 | 11 | 5 |
| 13 | 9 | 1.0 | 6.9 | 8.3 | 17 | 4–5 |
| 14 (Comparison) | 20 | 1.5 | 3.5 | 13.2 | 73 | 1–5 |
| 15 (Comparison) | 12 | 1.0 | 7.8 | 10.4 | 25 | 2–5 |

The effect of restricting the relationship between $l_2$ and $l_3$ is clear from the results shown in Table 2. The CV of $l_2$ and $l_3$ in Samples No. 11–13 was not more than 9%, while the CV of $l_2$ and $l_3$ in Comparative Samples No. 14 and 15 exceeded 10%. Further, when the bevel amount $l_1$ was made 4–20 μm in all 100 heads of Sample Nos. 1–4 and 11–13, the bevel amount $l_1$ of all other edge surfaces also became 4–20 μm, moreover the range R of the bevel amount at this time was not more than 5 μm, whereby it was confirmed that a uniform bevel amount was achieved for all edge surfaces.

We claim:

1. A thin-film magnetic head having a thin-film transducer element at an air outflow end of a slider,
   beveled edge surfaces being formed at edges completely surrounding an air bearing surface,
   the air bearing surface having at an air inflow end thereof a tapered inflow end surface continuous with a central flat planar surface, and
   $(l_4 - l_5)/l_5$ being not more than 0.4, where $l_4$ is the bevel width in regions located at the edge surfaces at opposite sides in a direction perpendicular to the air inflow direction and extending ±0.1 mm in the air inflow direction from, as a base point, a ridge portion between the central flat planar surface and the tapered inflow end surface, and $l_5$ is the bevel width of an air inflow end edge surface continuous with the tapered inflow end surface.

2. A thin-film magnetic head according to claim 1, wherein $(l_3-l_2)/l_3$ is not more than 0.2, where $l_2$ is the bevel width in regions located at the edge surfaces at opposite sides in a direction perpendicular to the air inflow direction and extending 0.2 mm toward the air inflow end from an interface between the slider and the thin-film transducer element, and $l_3$ is the bevel width of opposite side edge surfaces continuous with the central flat planar surface.

3. A thin-film magnetic head according to claim 1, wherein the bevel width $l_1$ of an air outflow end edge surface is 4-20 μm.

4. A thin-film magnetic head according to claim 3, wherein the bevel width of all edge surfaces is 4-20 μm.

5. A thin-film magnetic head according to claim 4, wherein a bevel width range R (JIS Z81081) of all edge surfaces is not more than 5 μm.

6. A thin-film magnetic head according to claim 2, wherein the bevel width $l_1$ of an air outflow end edge surface is 4-20 μm.

7. A thin-film magnetic head according to claim 6 wherein the bevel width of all edge surfaces is 4-20 μm.

8. A thin-film magnetic head according to claim 7, wherein a bevel width range R (JIS Z81081) of all edge surfaces is not more than 5 μm.

9. A thin-film magnetic head according to any of claims 1-5 or 6-8, wherein the air bearing surface is formed on a pair of rails provided on a surface facing a magnetic medium to lie parallel to the direction of air inflow at opposite sides in a direction perpendicular to the direction of air inflow.

10. A thin-film magnetic head according to any of claims 1-5 or 6-8, wherein the air bearing surface occupies almost the whole area of a surface facing a magnetic recording medium.

11. A thin-film magnetic head according to any of claims 1-5 or 6-8, wherein Vickers hardness HV (500 kg) of the slider of the thin-film magnetic head is not less than 1100.

12. A thin-film magnetic head according to claim 1, wherein the air bearing surface further comprises a polished surface.

13. A thin-film magnetic head according to claim 12, wherein the polished surface is formed using a diamond polishing film employing fine diamond particles.

14. A thin-film magnetic head according to claim 13, wherein the mean diameter of the diamond particles is not more than 1.0 μm.

15. A thin-film magnetic head according to claim 13 or 14, wherein the thickness of the diamond polishing film is not more than 1.0 μm.

16. A thin-film magnetic head having a thin-film transducer element at an air outflow end of a slider,
beveled edge surfaces being formed at edges completely surrounding an air bearing surface, and
$(l_3-l_2)/l_3$ being not more than 0.2, where
$l_2$ is the bevel width in regions located at the edge surfaces at opposite sides in a direction perpendicular to the air inflow direction and extending 0.2 mm toward the air inflow end from an interface between the slider and the thin-film transducer element, and $l_3$ is the bevel width of opposite side edge surfaces continuous with the central flat planar surface.

17. A thin-film magnetic head according to claim 16, wherein the bevel width $l_1$ of an air outflow end edge surface is 4-20 μm.

18. A thin-film magnetic head according to claim 17, wherein the bevel width of all edge surfaces is 4-20 μm.

19. A thin-film magnetic head according to claim 18, wherein a bevel width range R (JIS Z81081) of all edge surfaces is not more than 5 μm.

20. A thin-film magnetic head according to any of claims 16-19, wherein the air bearing surface is formed on a pair of rails provided on a surface facing a magnetic medium to lie parallel to the direction of air inflow at opposite sides in a direction perpendicular to the direction of air inflow.

21. A thin-film magnetic head according to any of claims 16 to 19, wherein the air bearing surface occupies almost the whole area of a surface facing a magnetic recording medium.

22. A thin-film magnetic head according to any of claims 16 to 19, wherein Vickers hardness HV (500 kg) of the slider of the thin-film magnetic head is not less than 1100.

23. A thin-film magnetic head according to claim 16, wherein the air bearing surface further comprises a polished surface.

24. A thin-film magnetic head according to claim 23, wherein the polished surface is formed using a diamond polishing film employing fine diamond particles.

25. A thin-film magnetic head according to claim 24, wherein the mean diameter of the diamond particles is not more than 1.0 μm.

26. A thin-film magnetic head according to claim 24 or 25, wherein the thickness of the diamond polishing film is not more than 1.0 μm.

27. A thin-film magnetic head having a thin-film transducer element at an air outflow end of a slider,
beveled edge surfaces being formed at edges completely surrounding an air bearing surface,
the bevel width of all edge surfaces being 4-20 μm, and
a bevel width range R (JIS Z81081) of all edge surfaces being not more than 5 μm.

28. A thin-film magnetic head according to claim 27, wherein the air bearing surface is formed on a pair of rails provided on a surface facing a magnetic medium to lie parallel to the direction of air inflow at opposite sides in a direction perpendicular to the direction of air inflow.

29. A thin-film magnetic head according to claim 27, wherein the air bearing surface occupies almost the whole area of a surface facing a magnetic recording medium.

30. A thin-film magnetic head according to any of claims 26-28, wherein Vickers hardness HV (500 kg) of the slider of the thin-film magnetic head is not less than 1100.

31. A thin-film magnetic head according to claim 27 wherein the air bearing surface further comprises a polished surface.

32. A thin-film magnetic head according to claim 31, wherein the polished surface is formed using a diamond polishing film employing fine diamond particles.

33. A thin-film magnetic head according to claim 32, wherein the mean diameter of the diamond particles is not more than 1.0 μm.

34. A thin-film magnetic head according to claim 32 or 33, wherein the thickness of the diamond polishing film is not more than 1.0 μm.

* * * * *